Patented Sept. 9, 1941

2,255,607

UNITED STATES PATENT OFFICE 2,255,607

PRODUCTION OF SYNTHETIC HYDRATED IRON OXIDES

Joseph W. Ayers, Easton, Pa., and George Plews, Berkeley, Calif., assignors to C. K. Williams & Co., Easton, Pa., a corporation of Pennsylvania No Drawing. Application July 22, 1937, Serial No. 155,008

10 Claims. (Cl. 23—200)

This invention relates to the production of synthetic hydrated iron oxides and to such oxides as new pigments. More particularly, it relates to an improvement over an already known general process wherein a heated solution of ferrous sulfate or other soluble salt is circulated by means of an air blast in contact with a bed of metallic iron whereby reaction and rapid oxidation produce a yellow hydrated ferric oxide which may, if desired, be calcined to produce red oxide of iron.

One improvement in this general process known in the art involves a preliminary treatment of the sulfate solution wherein a quantity of colloidal ferric hydrate is incorporated in the ferrous sulfate used by adding the alkaline precipitating agent, lime, to precipitate ferrous hydrate and introducing oxygen to oxidize the ferrous hydrate to form the colloidal ferric hydrate. Hydrated yellow oxide pigments produced by this prior process though superior to natural yellow oxides have many objectionable properties. The unavoidable presence of hydrated calcium sulfate therein causes reaction with drying oils of paints and varnishes, causes them to liver, retards their drying rate and necessitates excessive quantities of driers. In making colored papers, blotching and streaking occur when such pigments are used. Loss in tensile strength of concrete is obtained when such pigments are incorporated in cement mixes to impart color thereto.

Another already proposed improvement employs a different alkaline precipitating agent, namely, sodium hydroxide, and in addition carries out the oxidation in a novel manner by mechanical circulation of the solution over the bed of metallic iron and in contact with a limited supply of oxygen. This prior process, although superior to the earlier process particularly in producing far better yellow pigments, is not totally satisfactory in certain specific respects.

The present invention relates to yet another improvement and involves a preliminary treatment of the ferrous salt solution in which the same is not initially rendered alkaline in character as occurs when lime or sodium hydroxide is used, but is on the acid side. The novel initial treatment contemplates the addition of a substantially insoluble or only slightly soluble compound, preferably magnesium oxide, after which oxygen, air or other oxidizing agent is introduced in conventional manner. In contrast to the result obtained when caustic or lime is added, the insoluble magnesium oxide added does not completely nor immediately react with the ferrous sulfate to form a colloidal solution of hydrated ferric oxide. Although this single novel step of adding magnesium oxide in itself has certain advantages in operation and leads to superior pigments, especially the red oxides, additional improvements are obtained by careful regulation of the subsequent oxidation process in a manner hereinafter pointed out and such regulatory steps in conjunction with the step involving the use of such oxides are considered part of the present invention.

In accordance with a preferred embodiment of the present invention 45.6 pounds of ferrous sulfate dissolved in water to produce 43 gallons of solution are introduced into a suitable tank. Into this solution are introduced 5.79 pounds of magnesium oxide pulped in two gallons of water. The resulting mass is of acid character having a pH value of about 6.73. The solution is then agitated in an open vessel in such manner that the ferrous content is oxidized to the hydrated ferric oxide state by oxygen which may be taken up through absorption from the air. Alternately, the oxidation may be effected in a closed vessel and the air introduced through a suitable inlet or liberated in the solution at the proper rate. The oxidation of the solution is conducted at a comparatively slow rate and is accomplished in a period of at least several hours, usually about twenty-four hours. The oxidation should be carried out at an insufficient rate to cause a brownish cast in the yellow ferric oxide produced in the solution. When the oxidation is complete the suspensoid is quite yellow in appearance.

To this suspensoid is added an equal quantity of a dilute copperas solution having about 200 grams of copperas per gallon of water. Apparatus suitable for this treatment is already known and hence is not part of the present invention. It is preferably composed of two communicating compartments, which may be of concentric nature, connected in such manner as to permit a cyclic flow of solution. One of the compartments is provided with a mechanical stirring device of a propelling nature or other means independent of any air blast for causing continuous circulation between the two compartments. In the other compartment there is immersed below the surface of the solution a bed composed of scrap iron or other pieces of iron, through which the solution may be caused to flow without difficulty. A comparatively large bed of iron is provided in order to permit a high average rate of corrosion, although the rate of oxidation of the individual iron particles is maintained at a decidedly slow rate. Through the use of a suitable heating means in the tank, the temperature of the solution within the tank is brought preferably to about 145° F., although other temperatures suggested for this general process may be used. The propeller or other circulation means causes the solution to pass continuously from one chamber to the other and through the bed of iron in the iron-containing chamber in its passage.

Oxygen is supplied to the solution in such manner that the same is dissolved therein and carried in this form in contact with the iron. It is preferably supplied to the mass through exposure of the surface of the solution to the atmosphere during the circulation.

It is absolutely essential to the success of the instant process in producing superior yellow oxide pigments that the rate of oxidation of the iron be maintained at a slow rate, for if the oxidation is quickly effected an objectionable brownish cast is imparted to the iron oxide pigment obtained. In the present process, it is also essential that the solution be circulated through the bed of iron without undue agitation, for if violent agitation occurs, the iron oxide pigment obtained is in comparatively coarse particles and of poor color, and hence is not satisfactory.

During the circulation of the solution over the iron, a layer of hydrated oxide ranging from a pale green color at the iron surface to a yellow color on the outside is formed thereon. The simplest method of maintaining the proper rate of oxygen absorption is by regulation of the speed of circulation of the solution in contact with the atmosphere. The proper rate of circulation may be obtained by starting with a slow rate and increasing the same until the color changes to a cream shade and then noting the circulation speed at which a brownish cast begins to appear or fails to disappear and then maintaining the circulation speed at a slightly slower rate.

The circulation within the tank is continued for several days and may take as much as one hundred and ninety hours to complete the oxidation to the yellow oxide of iron stage. At the conclusion of the oxidation, the pulp is of a bright yellow color free of any brownish cast. During the oxidation the color of the material deepens and becomes yellower and yellower and also brighter.

The precipitation rate of the hydrated yellow oxide in the above process is comparatively high and averages about 143.74 pounds of precipitate per hour over the entire period of one hundred and ninety hours.

When the oxidation is complete, further circulation of the solution over the iron is discontinued, the solution then being withdrawn from the tank, the yellow ferric oxide being filtered therefrom. Thereafter, the oxide is either washed and dried to produce the desired yellow pigment or is calcined to produce red pigments of various shades. Most of the magnesium sulfate formed during the initial oxidation as a result of the addition of the magnesium oxide is removed during this filtering and washing operation.

In producing a series of red pigments, portions of the yellow pigment are calcined in conventional manner at 1200°, 1300°, 1350° and 1400° F. That portion calcined at 1300° F. is especially bright and clear and has a yellowish tint. It possesses strong tinting power as compared with other synthetic red oxides. Upon analysis, it will be found to contain 97.3% $Fe_2O_3$. The red pigments produced in this manner are brighter in top color and have much stronger tints than similar products produced by the older process wherein lime is used as an alkaline precipitating agent in the initial reaction.

In accordance with a second embodiment of the present invention, another member of the magnesia family is employed instead of the magnesium oxide, namely, zinc oxide. The process using zinc oxide is run in substantially the same manner hereinabove described. The initial oxidation to produce hydrated ferric oxide in the ferrous salt solution usually requires a longer time than when magnesium oxide is used, a period of seventy-two hours often being required.

It should be understood that the present invention is not limited to the specific details herein given but that it extends to all equivalent materials and operating procedure which will occur to those skilled in the art, the scope of the invention being expressed in the following claims. For example, where the oxides of magnesium or zinc are specified, the hydroxides are likewise included.

We claim:

1. In the production of iron oxide by introducing oxygen into a heated solution of ferrous sulfate circulated in contact with metallic iron, the improvement which comprises, as a step preliminary to such treatment, incorporating a material consisting substantially wholly of magnesium oxide in a solution of ferrous sulfate and oxidizing until yellow ferric oxide is formed in the ferrous sulfate solution.

2. In the production of iron oxides suitable as pigments, the combination of steps which comprises adding a material consisting substantially wholly of magnesium oxide to a solution of ferrous sulfate, introducing oxygen into the resulting acid solution thereby converting the ferrous content into yellow ferric oxide, cautiously circulating the resulting suspensoid containing ferrous sulfate in dilute solution over metallic iron, said liquid mass being in heated condition, supplying oxygen to the flowing mass at an insufficient rate to form a brownish cast in the oxide and discontinuing the treatment when an intense bright yellow color is obtained.

3. In the production of iron oxide by introducing oxygen into a heated solution of ferrous sulfate circulated in contact with metallic iron, the improvement which comprises as a step in preparation for such treatment, adding a material consisting substantially wholly of magnesium oxide to a ferrous sulfate solution, slowly oxidizing the ferrous content of the solution over a period of at least several hours until a suspensoid of yellow ferric oxide is obtained in the ferrous sulfate solution.

4. In the production of iron oxides suitable as pigments, the combination of steps which comprises adding a material consisting substantially wholly of magnesium oxide to a solution of ferrous sulfate, slowly oxidizing the ferrous content of the solution over a period of at least several hours, thereby forming yellow ferric oxide and magnesium sulfate, adding a dilute solution of ferrous sulfate, immersing metallic iron in the resulting solution, repeatedly and cautiously circulating the solution over the iron and supplying oxygen to the solution at a rate to effect oxidation to the yellow oxide stage in a period of at least several days, and separating the solution and dissolved magnesium sulfate from the yellow oxide of iron.

5. The method of producing brighter and stronger-tinting red oxides of iron which comprises adding a material consisting substantially wholly of magnesium oxide to a solution of ferrous sulfate, introducing oxygen into said solution at a slow rate to form a suspensoid of yellow ferric oxide, cautiously circulating said solution containing ferrous sulfate in dilute form over metallic iron, supplying oxygen to the flowing mass at a slow rate insufficient to impart a brownish cast in the oxide until an intense bright yellow color is obtained, separating said yellow oxide from the solution and calcining the same to produce red oxide of iron.

6. In the manufacture of iron oxides suitable for pigment purposes, the process which comprises adding a material consisting substantially wholly of magnesium oxide to a ferrous salt solution, introducing oxygen into the resulting solution until the same takes on a yellow color, immersing metallic iron in said solution, circulating said solution over said iron, introducing oxygen into said solution at a controlled rate adapted to effect slow oxidation, said rate being insufficient to cause a brownish cast in the oxidation product obtained, continuing the said oxidation treatment until the mass becomes a deep, bright yellow.

7. In the production of iron oxide by introducing oxygen into a heated solution of ferrous sulfate circulated in contact with metallic iron, the improvement which comprises, as a step preliminary to such treatment, preparing the ferrous sulfate solution by adding a material consisting substantially wholly of an oxide of a metal of the magnesium family selected from the group consisting of magnesium and zinc, and slowly oxidizing the ferrous content to produce yellow ferric oxide in the sulfate solution.

8. In the production of iron oxide by introducing oxygen into a heated solution of ferrous sulfate circulated in contact with metallic iron, the improvement which comprises as a step preliminary to such treatment, preparing the ferrous sulfate solution by adding zinc oxide and slowly oxidizing the ferrous content to produce yellow ferrous oxide in the sulfate solution.

9. A yellow tinted red oxide of iron having a bright top color and strong tinting power produced by circulating a solution containing ferrous sulfate, yellow ferric oxide and magnesium sulfate over metallic iron, slowly oxidizing to produce bright yellow oxide and calcining said oxide in the usual manner, said solution being formed by adding a material consisting substantially wholly of magnesium oxide to a ferrous salt solution and slowly oxidizing to convert the ferrous content to yellow ferric oxide.

10. A yellow tinted red oxide of iron having a bright top color and strong tinting power produced by adding a material consisting substantially wholly of magnesium oxide to a ferrous sulfate solution, introducing oxygen into the resulting solution which is slightly acid in character, thereby producing yellow ferric oxide, subjecting the resulting liquid mass containing ferrous sulfate, yellow ferric oxide and magnesium sulfate to slow oxidation while circulating the mass over metallic iron until bright yellow oxide is obtained and calcining said oxide to produce the red oxide.

JOSEPH W. AYERS.
GEORGE PLEWS.